(12) United States Patent
Sarusi et al.

(10) Patent No.: US 10,692,119 B2
(45) Date of Patent: Jun. 23, 2020

(54) EFFICIENCY OF E COMMERCE SHOPPING FROM A PICTURE OR MOTION PICTURE ON THE INTERNET

(76) Inventors: Shlomit Sarusi, Ramat Gan (IL); Jacob Sarusi, Ramat Gan (IL)

(*) Notice: Subject to any disclaimer, the term of this patent is extended or adjusted under 35 U.S.C. 154(b) by 861 days.

(21) Appl. No.: 11/750,345

(22) Filed: May 18, 2007

(65) Prior Publication Data

US 2007/0271156 A1  Nov. 22, 2007

Related U.S. Application Data

(60) Provisional application No. 60/747,600, filed on May 18, 2006.

(51) Int. Cl.
 *G06Q 30/00* (2012.01)
 *G06Q 30/06* (2012.01)
 *G06Q 30/02* (2012.01)

(52) U.S. Cl.
 CPC ..... *G06Q 30/0603* (2013.01); *G06Q 30/0226* (2013.01); *G06Q 30/0601* (2013.01); *G06Q 30/0605* (2013.01); *G06Q 30/0621* (2013.01); *G06Q 30/0623* (2013.01); *G06Q 30/0625* (2013.01); *G06Q 30/0633* (2013.01); *G06Q 30/0643* (2013.01)

(58) Field of Classification Search
 CPC ........ G06Q 30/02; G06Q 10/08; G06Q 30/06; G06Q 30/0601; G06Q 30/00; G06Q 30/0643; G06Q 30/0603; G06Q 30/0605; G06Q 30/0621; G06Q 30/0623; G06Q 30/0625; G06Q 30/0633; G06Q 30/0226
 USPC .................................. 705/26, 27, 26.1, 27.1
 See application file for complete search history.

(56) References Cited

U.S. PATENT DOCUMENTS

| | | | |
|---|---|---|---|
| 6,029,141 A * | 2/2000 | Bezos | G06Q 20/0855 705/26.41 |
| 7,107,221 B1 * | 9/2006 | Tracy et al. | 705/26.81 |
| 7,197,475 B1 * | 3/2007 | Lorenzen | G06Q 30/02 235/383 |
| 7,315,830 B1 * | 1/2008 | Wirtz | G06Q 30/0207 345/418 |
| 7,757,944 B2 * | 7/2010 | Cline et al. | 235/383 |
| 8,121,902 B1 * | 2/2012 | Desjardins et al. | 705/26.1 |
| 8,326,690 B2 | 12/2012 | Dicker et al. | |
| 2001/0044751 A1 * | 11/2001 | Pugliese, III | G06Q 30/02 705/14.1 |

(Continued)

OTHER PUBLICATIONS

"Electronic Shopping: Designing Online Stores with Efective Customer Interfaces Has a Critical Influence on Traffic and Sales," by Gerald L Lohse and Peter Spiller, Communications of the ACM, 41.7: 81(8), Association for Computing Machinery, Inc., Jul. 1998 (Year: 1998).*

*Primary Examiner* — Anne M Georgalas

(57) ABSTRACT

Method and system for adding items, services and sales, to a shopping cart directly from a static or moving picture while maintaining same user interface which includes all site navigating and controls, shopping cart and ordering picture. The picture can combine multiple products from various merchants. Method further defines payment procedures using pre/post paid cards, credit cards, localized payment cards/coupons/promotion codes/web-site links and the like payments options. Method further defines ways to define personal/group catalogs and personal preferred sale catalogs.

56 Claims, 8 Drawing Sheets

(56) References Cited

U.S. PATENT DOCUMENTS

| | | | |
|---|---|---|---|
| 2002/0049637 A1* | 4/2002 | Harman | G06Q 30/02 705/26.1 |
| 2002/0143660 A1* | 10/2002 | Himmel et al. | 705/27 |
| 2002/0143662 A1* | 10/2002 | Clark et al. | 705/27 |
| 2002/0152127 A1* | 10/2002 | Hamilton et al. | 705/26 |
| 2003/0200156 A1* | 10/2003 | Roseman | G06Q 30/02 705/26.44 |
| 2005/0022226 A1* | 1/2005 | Ackley | G06Q 30/0601 725/23 |
| 2006/0041485 A1* | 2/2006 | Tarvydas | G06Q 30/06 705/26.62 |
| 2006/0085277 A1* | 4/2006 | Arnston | 705/26 |
| 2006/0089843 A1* | 4/2006 | Flather | 705/1 |
| 2006/0230123 A1* | 10/2006 | Simmons | G06Q 30/0603 709/219 |
| 2007/0179858 A1* | 8/2007 | Jennings | G06Q 30/06 705/51 |
| 2007/0271147 A1* | 11/2007 | Crespo | G06Q 30/06 705/26.2 |

\* cited by examiner

| Error message and user information section like – Your current point balance is 178 points. ||||||
|---|---|---|---|---|---|
| Store | Item name | Change | Quantity | Amount | Remove |

301 — Store one  
304 — Item one | Change | 1 | 100.00 | Remove — 303  
305 — Item two | Change | 1 | 110.00 | Remove  
       Special delivery for item two   25.00  
306 — Item three | Change | 1 | 98.00 | Remove  
       Store one delivery   12.00  
       >>> Special "mother's day" deal to explore — 307

Store two  
    Item 4 | change | 1 | 66.00 | Remove  
    Special delivery for item 4   14.00  
    Item 5 | Change | 1 | 65.00 | Remove  
308 — > Free benefit for item 5   free  
309 — Package 1 | Cahnge | 1 | 55.00 | Remove  
    Store two delivery   15.00

Items total   439.00  
       Delivery total   66.00  
       Total   505.00

310 — Submit  
311 — Clear all

Fig 3

Fig 5
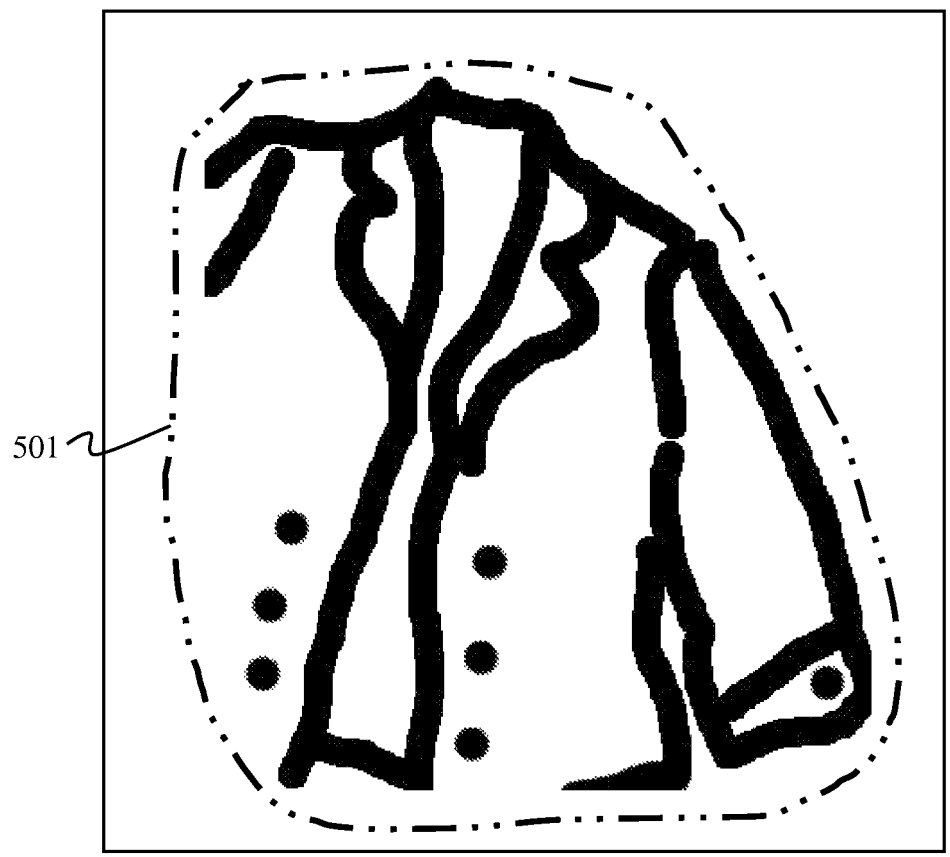

| Store | Item name | Change | Quantity | Amount | Remove |
|-------|-----------|--------|----------|--------|--------|
| | | Items total | | 0.00 | |
| | | Delivery total | | 0.00 | |
| | | Total | | 0.00 | |

701 — Empty shopping cart

702 — [image of two figures with Click 1 (705) and Click 2 (706)]

703

| Store | Item name | Change | Quantity | Amount | Remove |
|-------|-----------|--------|----------|--------|--------|
| Store one | | | | | |
| | Female Jacket | Change | 1 | 100.00 | Remove |
| | Store one delivery | | | 12.00 | |
| | | Items total | | 100.00 | |
| | | Delivery total | | 12.00 | |
| | | Total | | 112.00 | |

704

| Store | Item name | Change | Quantity | Amount | Remove |
|-------|-----------|--------|----------|--------|--------|
| Store one | | | | | |
| | Female Jacket | Change | 1 | 100.00 | Remove |
| | Store one delivery | | | 12.00 | |
| Store two | | | | | |
| | Male Jacket | Change | 1 | 90.00 | Remove |
| | Store two delivery | | | Free | |
| | | Items total | | 190.00 | |
| | | Delivery total | | 12.00 | |
| | | Total | | 202.00 | |

Fig 7

EFFICIENCY OF E COMMERCE SHOPPING FROM A PICTURE OR MOTION PICTURE ON THE INTERNET

FIELD OF THE INVENTION

The invention relates to product presentation and ordering in E commerce web site over the Internet or organization Intranet. In particular, it relates to a method of presenting existing sale advertisement materials and adding item to a shopping cart directly from a static or moving picture in an effective and convenience matter, thus increasing sales on the web site.

BACKGROUND OF THE INVENTION

Shopping E commerce sites is rapidly growing. Web site owner, in order to attract customers to buy from their E commerce shop over the network, spends enormous efforts and money. Payment and shipping methods are also becoming trustable and reliable, thus allowing global worldwide sales.

Different approaches are used by web sites to present items for sale. All approaches are using "technical" item presentation and ordering which means pictures of a seller-preferred size are presented to the user together with basic and pricing information regarding the product, "buy me" button and/or "more info" button and/or "customer review" and/or "enlarge picture" button. Each of the web site defines its preferred item presentation structure and it applies to all presented items. This "technical" presentation and ordering will be referred thereafter as "technical shopping". Following some disadvantage of "technical shopping":

Clicking on the "more info" button and/or clicking on the picture opens/jump to a more info window. As a result of the "technical shopping", the presented more info page might present the exact same information previously presented organized differently on the page. This bothers the user and generates anti trust feeling.

Most web sites that presents single item pictures in the "technical shopping" lacks the associative presentation/shopping that merchant/buyer has when shopping in a department store. It also lacks the positioning/combination/arrangement of the item that expose it in more intense way. These web sites sales are based on user needs or good pricing, missing the potential of spontaneous and enthusiasm or pop up need that are based on the way items are presented in expert designer arrangement and combination that attract shoppers and increase sales.

Catalog, magazine, or other pictures combining multi items picture in an appropriate surrounding are presented to the user to take advantage of printed or specially designed promotion materials designed by professional designer to stimulate user senses. The number of stores/brand names that allow their E commerce user to shop using their web site version of their professional designers printed catalog is growing (usually this is not the default interface presented to the user. User is transferred when clicking "catalog" link at site). Some sites present in site home page and/or in category main page, combined multi items picture in an appropriate surrounding. In this case, "clicking" on the item or page will transfer the user to a "more info" "technical" structured page of the clicked item, or a list of the items that were presented at the picture. The page include the regular buttons of "buy me", parameter selection box when needed and the like. To buy another item that was presented at the picture, user need to use navigation button to return back to the originating page. Following are some problems that spoil this shopping experience:

User that wants to add different items from same page will be transferred forth and back per item added (transferred to the "more info" page, press "add to cart" transferred to the shopping cart page, pressing continue shopping transfer back to the originating page). These transfers generates inconvenient feelings in the user mind, and can lead to lose of synchronization and disconnect the user from being exposed to the attractive page thus leads to smaller chances for multiple buy.

Worse case is when user is familiar with the product and doesn't need "more info" page. In these cases, transferring the user to unnecessary pages might stop him from buying additional items that were presented at the same picture.

In current E commerce, it is not possible to add items from a picture to a multi store/brand shopping-cart. This disadvantage limits the possibility to use multi store/brand promotion material and exploit the impact of combined picture. Only stores that shops the majority of the items presented in the picture can take advantage of the picture. For example, fashion magazine shows pictures of a model wearing "Banana republic" shirt and pans, "Aldo" shoes, "Police" Sunglasses holding "Opium" perfume.

Other promotion materials attracting users by means of sales and/or deals and/or coupons presented as a picture. These sales/deals/coupons can be vendor specific or group of vendor related. Current web site support coupon and promotion code discount where the reward is constant (20% off, $15 off and the like).

The following is an example for a deals that needs dynamic reward processing and not supported in current web sites:— buy 1 item from the following list, and get up to 2 items from reward list for 30% off.

This example is very simple still it is not supported by web sites. This is inconvenient for the user. It also disable from store to take advantage of this kind of promotion material.

BRIEF SUMMARY OF THE INVENTION

The presented invention is directed to method and system for improving efficiency of E commerce while shopping from a picture or motion picture on the Internet and a method and apparatus to make e commerce shopping from store pictures or motion pictures presented on the Internet and/or organization intranet efficient, spontaneous, enthusiastic, customized while maintaining single user interface, using all existing promotion materials to encourage the user to shop, including catalogs or magazines pictures that includes items from multiple store and the like. These picture and motion picture may be based on professional sale promotion materials like a catalog, magazine, brochure, leaflet, video materials that comes to promote item sale and other sale promotion materials. It includes ordering procedure and all supporting surrounding that enable a convenient and efficient shopping including:—

Ways to present more information in addition to the information on the picture or motion picture.

Ways to handle items, sales message and/or sales/promotion messages on the picture or motion picture that need user interaction to specify relevant parameters.

Ways to support multi items/multi vendors and/or any combination on the same picture or motion picture.

Ways to support payment with user localized payment cards or coupons that are presented as payment option.

The presented invention keeps all shopping surrounding in a single user interface that includes all navigating and shopping information. Adding item to shopping cart is short (usually single click on presented item to add) and adapt intelligently to the presented item and parameter to choose from. Shopping cart is detailed, clear, and support multi store shopping cart. Sopping cart information includes store, item, deals, deliveries and other information for better shopping experience.

Payment option if apply, including all available options including pre-post card, money bank transfer, credit cards and those used out the web like: localized coupon.

BRIEF DESCRIPTION OF THE SEVERAL VIEWS OF THE DRAWING

FIG. 3 is an example for shopping cart that includes items from two vendors/store.

FIG. 5 is an example for item and deal selection area.

FIG. 7 is an example for shopping cart changes as result to clicking a "direct add" item area.

DEFINITION LIST

Figure 1:
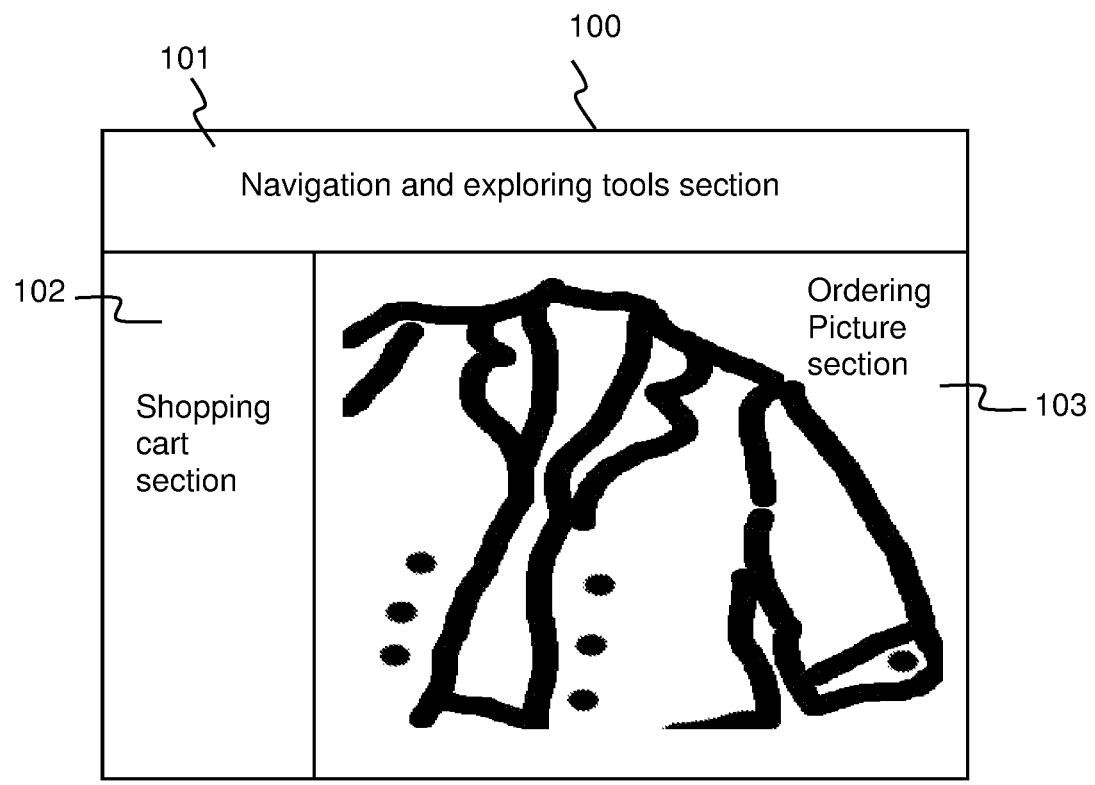
FIG. 1 is an example to the single user interface in landscape mode.

In order to better understand this invention following are term definition that will be used. Reference will be made to figures in the accompanying drawings. Wherever possible, the same reference numbers will be used throughout the drawings to refer to the same or like elements. Referring number will be place in square brackets ([ ]):—

The term "e commerce" or "e commerce web site" will be used thereafter to indicate Electronic commerce where a plurality of client computer (users) connected via internet/intranet network to service servers, better known as web servers, browse and shop for store merchandise. These web servers usually use dynamic scripting language like ASP, PHP and/or like to expand service flexibility. Almost all "e commerce" web server pages are therefore dynamically generated. Database is also used to hold and manipulate all site related data.

The term "click" will be used thereafter to indicate the action that cause a selectable object to be selected by means of a mouse click, keyboard selection (enter or space), tablet selection (touch pen) or any other method on any computerized equipment connected to the internet or organization Intranet, that finally cause the same operation as clicking with a mouse on a clickable area (picture/motion picture/button/link and the like).

The term "ordering picture" [103] will be used thereafter to indicate a picture and/or motion picture that can combine single/multiple items from single/multiple stores/brand. It can further be web version of promotion materials like poster and/or catalogs and/or magazine and/or day/week/month sales/deals promotion material (for example flyers) or web dedicated promotion materials. These pictures may be designed by experienced designers for the purpose of attracting users to buy from the presenting web site. Static picture will be referred as "static ordering picture". Motion picture will be referred as "moving ordering picture" and can have flow controls like slow/freeze/stop/play and the like. "ordering picture" will refer commonly to static and moving ordering picture. The ordering picture is processed statically before deploying to the internet or organization intranet and/or processed dynamically to insert icons and/or text and/or pricing. It is also processed to define sensitive areas. The sensitive areas are used to define items/multi-store items/deals/bulk sale for ordering and/or service icons for sale supporting services like a more info frame, presenting complementary information about the item in interest, and language translation frame, presenting information presented on the picture in the language selected by the user, and/or the like.

The term "navigating tools" or "exploring and navigating tools" will be used thereafter to indicate all control and command buttons and links that enable the customer to explore stores/items, comprising language select, store select, multi level category select, page select, search tool, zooming [404-406], fast page/picture scan [402,403], user feeds and others. The search tool is arranged to receive a search submission and display search results. Said search results present fast scanning picture of all pages from all stores that match the search query. Next to the said fast scanning picture page item list is presented that include items brief like item name and price and/or special deal info and/or icon. Item brief presented may be limited in length.

The term "local frame" will be used thereafter to indicate user interaction frame [602-604] (usually rectangle) that usually appears around the place where "click" triggered its appearance. It opens in a way that it would appear as a whole (where applicable). Such "local frames" are used to present "more info" [602] information and/or "parameter select" [603-604] info and/or "provider select" information. "Local frame" usage eliminates the need to transfer the user into separate page for limited task such as "more info", "parameter select" and the like keeping the "same user interface". There are "local frame" with "close" button/icon that when "clicked" close the "local frame".

The term "benefit" will be used thereafter to indicate any discount (by means of percentage price discount and/or fix price discount) or free reward for item or items related to one or more categories from one or more stores, or discount/free services or any other user rewards. There are cases where it is required to present to the user a "benefit" choice selection list. We will refer thereafter this choice "benefit" as "benefit choice" and a singular choice "benefit" as "singular benefit". This "benefit choice" selection list will appear in a "local frame" and the user will be able to select one or more "benefits" from the choice list according to the "benefit" terms. We will refer this "benefit" selection "local frame" thereafter as "benefit list". Free "benefits" will be selected by default in the "benefit list".

The term "shopping cart" [102] will be used thereafter to indicate part of the page/or a frame that display the status of user orders. It can be hidden/revealed (to enable more screen for "ordering picture") at all time by means of a "click". In certain embodiments, a dedicated tool is provided arranged to hide the shopping cart, thereby allowing a larger area for a picture. When hidden, a user will be able to identify the global status of the shopping cart by means of the shopping cart total and/or shopping cart item count and/or last item added to shopping cart details and/or any other global shopping cart details. When hidden, bringing the pointing device near the said hide/reveal control or pressing short cut key reveals the shopping cart until the pointing device is off the hide/reveal control or closed by the user. "Shopping cart" is arranged to be clear and easy to understand. "Shopping cart" information includes shop information [301], items information [304], delivery information [305,306], pending special sale and deals [307], special sale, deals or packages [308,309]. "Shopping cart" elements are grouped and sorted per shop and/or any other centralizing category and includes:

shop information (for example store name) [301]

Item information [304] includes among others name, quantity and price.

Alter controls: Each item can be quantity altered [302] and/or deleted [303]. When altering item quantity all related information is updated including delivery and deals.

Delivery information includes: (a) item delivery cost where applicable [305] applies specifically for the item ordered, for example refrigerator may have special delivery amount, (b) store delivery cost [306] where applicable, (c) self-pickup indication where applicable, and (d) distribution selection list.

Item related sale/deal/"benefits" [308] appears next to the item where applicable. Shop related sale/deal/"benefits" appears per shop where applicable. Sale/deal/"benefits" are distinct using different color/font/size enabling the user to define the status of the "shopping cart" in a glance. It appears a user add and item with related benefit that was explored or automatically applied into the shopping cart.

"clear all" [311] button/icon that when clicked clears the shopping cart.

submit button [310] enabling the user to use one or more of the suggested paying method and procedure for checkout.

Figure 2:
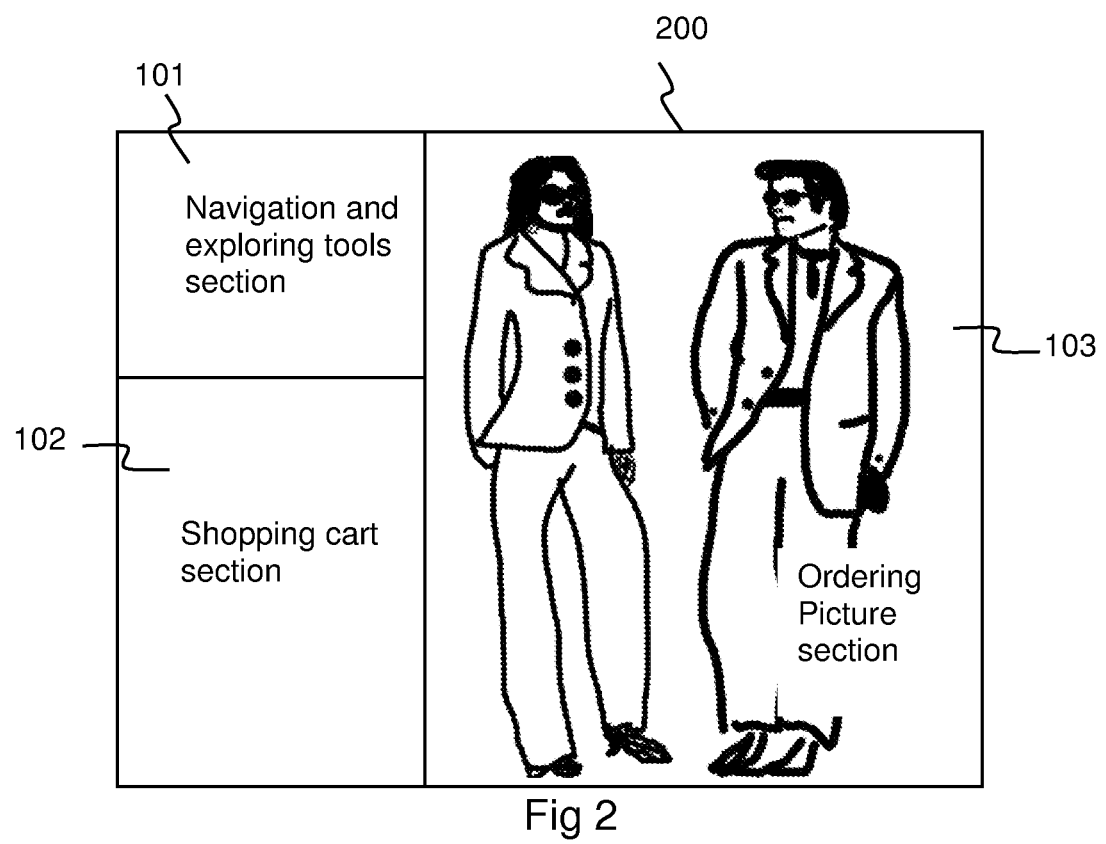
FIG. 2 is an example to the single user interface in portrait mode.
Figure 4:
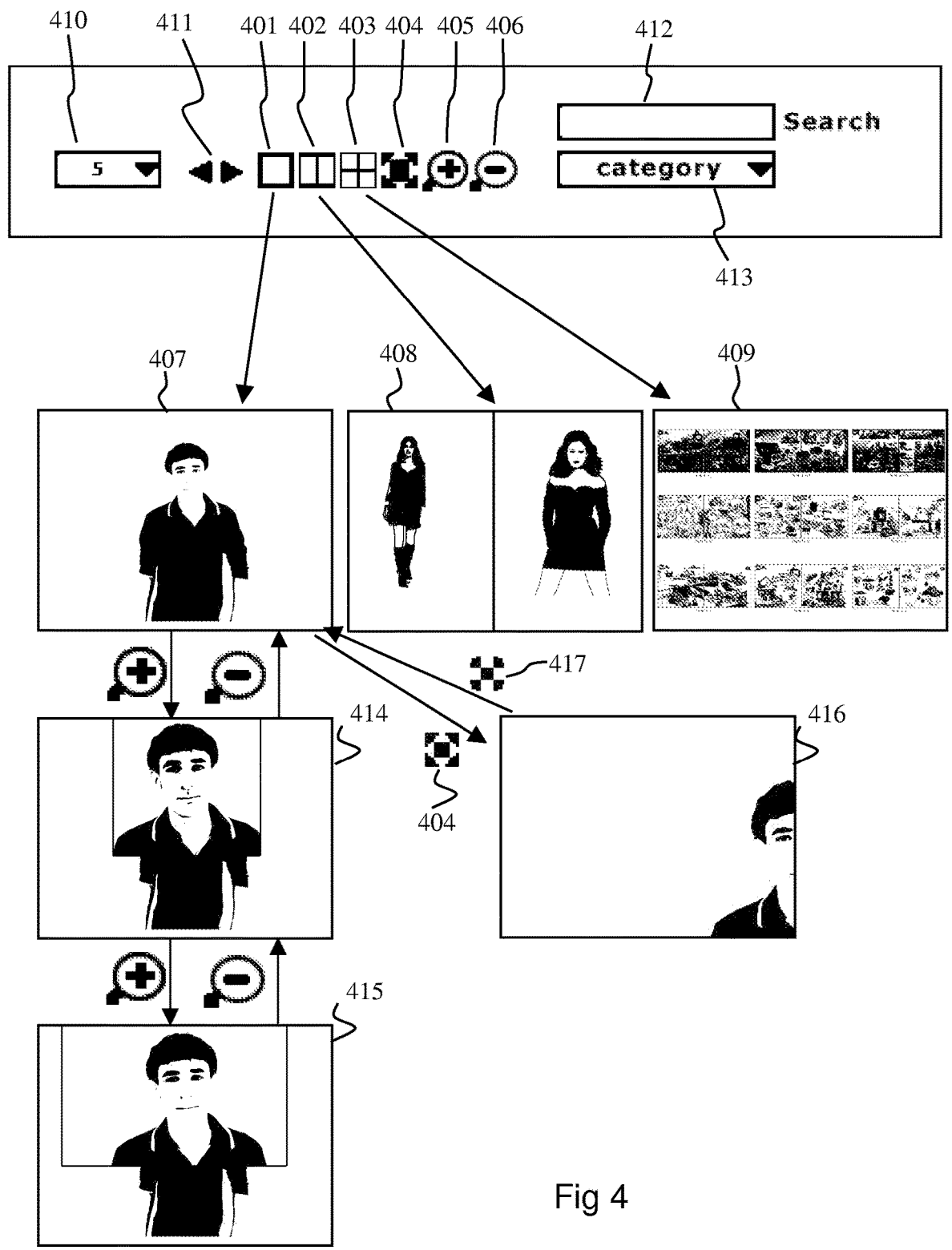
FIG. 4 is an example for navigation and exploring section (in landscape mode) and examples for button controls and button control selection result.

The term "same user interface" or "single user interface" will be used thereafter to indicate user interface that includes all shop navigating and information controls [101], "shopping cart" [102] and/or "shopping cart" revealing control and a pictures area [103] needed for the user to navigate and add items from various stores pages to a multi store "shopping cart". As illustrated in FIGS. 1-2, preferably the "single user interface" is displayed on a single display, i.e. all shop navigating and information controls [101], "shopping cart" [102] and/or "shopping cart" revealing control and pictures area [103] needed for the user to navigate and add items from various stores pages to a multi store "shopping cart" are arranged such that they are all simultaneously displayed on the single display. Picture area may include single "ordering picture" [407]/double [408]/fast scanning pictures [409]. Information control may include: single [401]/max size single [404]/double [402]/fast browsing mode [403], zoom in [405]/zoom out [406], page skipping and the like controls. The picture area may be presented in various resolutions: fast scan-Small pictures are presented. Picture size is calculated to enable, in the preferred embodiment, 4 rows with 6 pictures in a row. Slow scan-Two pictures are presented. Picture size is calculated to best-fit window frame height and width. Picture-Single picture is presented, normally it fits within the picture frame. Picture is orderable. Enlarged picture-Enlarged single picture. In this mode, user needs to use scrolling bars to explore the entire picture. In order to make it more convenient for the user, an auto scroll feature is also available eliminating the need to use scroll bars. The ratio between the picture and the enlarged picture is defined by store administration. Enlarged picture is orderable. As described below, the picture presented in normal mode will fit into picture frame in a standard display (in the preferred embodiment 1024×768 pixels window size). The user can then chose to see enlarged picture or use zoom magnifier. In both the normal mode and the enlarged picture, the user can "click" and add item to "shopping cart".

Default layout is landscape, [for example display 100]. Store may prefer portrait layout [for example display 200]. In this case when user switch to these stores layout switches automatically. Other layouts may be introduced for store and user selection. Layout may change also according to the width and length of the surfing window to enable optimization according to store pictures dimensions.

The term "more info" will be used thereafter to indicate the information that is complete and/or complimentary to the information presented in the "ordering picture". Usually "more info" is presented in a "local frame" [602]. When "more info" is large (can not feet into "local frame" without affecting the texture of the "ordering picture") like for example in the case of professional digital camera, clicking on the "more info" icon [601] will open a new window with the appropriate complementary information page. This window may include a "close window" button that will close the window and raise the original window on click. We will refer this window as "more info window".

The term "language translation" will be used thereafter to indicate a "local frame" that present information in different language than the presented language in the "ordering picture". It is accessible when user selected interface language different from the store/vendor language definition. "Clicking" on text section that appears on the "ordering picture" shows the "local frame" with the translated text.

The term "parameter select" will be used thereafter to indicate a selection "local frame" [603-604] to enable the user to select preferred color and/or preferred size and/or fabric type and texture and/or any other parameter selection for the item needed in order to complete item addition to "shopping cart". Selection is done by means of colored select boxes, item related color palette, check boxes, alternative check box (better known as HTML radio button), icons, small pictures and the like. "Click" on the parameter will add the selected parameter item to the "shopping cart" and close the "parameter select". In multi parameter selection frame [603], a "Submit" button is presented. "Click" it will add the item to "shopping cart" after validating the selected parameters.

The term "provider select" will be used thereafter to indicate a selection "local frame" to enable the user to select preferred store/vendor for the item. This is applicable when there is more than one store/vendor quoting price for the item. The user will select its preferred store to order from. Usually it will contain store names, item price per store, delivery charge per store where applicable and/or store location and/or service locations and/or store service rating or any other information needed. Selection is done by means of "click" store/vendor.

The term "group bulk sale" will be referred thereafter to indicate special sale activity that allow reduced price for a predefined number of items within predefined limited time. There are various embodiments for this sale. Following some sale examples for sale terms:

All the amount of items must sell before end of sale.

Minimum amount from the items must sale before end of sale.

Only one kind of item is presented for sale.

Group of items is presented for sale for the user to select from.

Price declines as more items are bought.

With or without Cancellation fee.

The term "flex group bulk sale" will be referred thereafter to indicate special "group bulk sale" that:—
Allow selection from multiple items as reduced price, we will refer it thereafter as "item flex group bulk sale"
And/or
Allow change in price reduction according to the total amount of items that are bought in the "group bulk sale". We will refer it thereafter as "price flex group bulk sale".
For example:—

---

Buy colored bed sheets for $20 or less.
Available in red, blue and green.

| Price for 1 to 100 sheets sold is | $20 |
| Price from 101 up to 200 sheets sold is | $18 |
| Price from 201 up to 500 sheets sold is | $15 |

In this example user will have the ability to choose bed sheet color and if accumulated number of sheets sold is more than 200 the price each of the users pays per item is $15.

The term "group sale select" will be referred thereafter to indicate a "local frame" presenting all information regarding the "group bulk sale". It usually include sale information like number of items suggested, minimum items quantity for sale to apply, time frames, pricing information including delivery, amount of items already bought, item/parameter select where applicable (similar to the way "parameter select" present parametric information), it may include possibility to share sale information with friends (optionally accelerate sale termination), "join the sale" button and "close window" button. When "clicking" "join the sale" button, it enables the user to commit to sale terms (including payment information).

The term "static inserted info" will be referred thereafter to indicate information that is part of the picture (information inserted using picture editor in the design and/or deployment preparation stage). It is used to present pricing information and/or text and/or icon. For example, adding warranty information to a magazine picture. In the preferred embodiment of this invention, it should be used to insert long terms information to a picture.

The term "dynamic inserted info" will be referred thereafter to indicate information that is dynamically changing in the picture. This means that raw pictures [804] are dynamically pre processed [802] before being presented to the user [805]. It is used for the same purposes as "static inserted info" and is more flexible. In the preferred embodiment of the invention, it will be used for short or rapidly changing information.

The term "item area" [501] will be referred thereafter to indicate the "sensitive area" that defines an item. It might be picture of the item and/or any sign and/or text representing the item on/off the "ordering picture" or any combinations. For example in some catalogs, item details and price can be found on the bottom of the page. In this case, the "item area" can be the picture of the item or the detailing text and price or both.

The term "group sale area" will be referred thereafter to indicate the "sensitive area" that defines a "group sale". It might be the "group sale" and/or any sign and/or text representing the "group sale" on/off the "ordering picture" or any combinations.

The term "item deal area" [502] will be referred thereafter to indicate to the "sensitive area" that defines a package deal for one item or more with single or more "benefits". It might be the deal itself and/or any sign and/or text representing the deal on/off the "ordering picture" or out of "ordering picture" or any combinations. An icon and/or text and/or any other sign are presented to the user using "static inserted info" and/or "dynamic inserted info". "Click" on the area that defines a package deal for one item or more with single or more "benefits". It might be the deal itself and/or any sign and/or text representing the deal on/off the "ordering picture" or any combinations.

The term "direct add" will be used thereafter to indicate adding item/deal/package and other orderable into a "shopping cart" [FIG. 3. and 703, 704] directly from an "ordering picture" [702] by means of single "click" [705, 706] on "item area" [501]/."group sale area"/"item deal area" [502].

The term "deal" will be used thereafter to indicate item/department/store sale, coupons, promotion code, package deals or any kind of promotion sale entitling the user "benefits" and encouraging the user to shop. These "deals" can be vendor specific or group of vendor related. Some "deals" are term dependent which means that some condition should be meet before the "benefit" can apply. We will refer these terms thereafter as "deal terms". In some cases multiple choice of "deal terms" are presented for a "deal". We will refer it thereafter as "deal term choices". List of all term choices is presented to the user in a "local frame" to select preferred choices. We will refer this list thereafter as "deal term choice list". Following example clarifies it:

---

Buy
1 large pizza (5 possible choices) or 1 pasta plate (3 possible choices)
And
2 salads (4 possible choices)
For $15.
The user will be presented in the "deal term choice list" 1 of 5 options to select pizza or 1 of 3 options to select pasta plate and 2 of 4 options to select salads.

---

Stores can introduce many "deals" variations.
Common "deals" term:—
Buy specific item, Buy from a specific shop, buy minimum order from one or more vendors, buy minimum quantities of one item or more, insert promotion/coupon code, accumulate store point in a period of time, buy in the next 3 days and the like. "Deals" examples:—
Accumulate $300 of buying in April and get free car service in June.
Buy one tire and get up to 3 more for 20% off or get one more for 40% off.
Buy one large 12 slices pizza with 2 extras and 1.5 liter soda and get 2 personal pizza or 2 cans of soda The term "sum deal" will be referred thereafter to indicate a "deal term" of minimum ordered sum of one item/group of items from a category/categories/store/stores/whole-"shopping cart"

The term "flexible payment procedure" will be referred thereafter to indicate payment procedure that allow users to pay for the purchase online or offline using one or more paying options and includes: credit cards or other prepaid and/or post paid electronic cards, company cards, member club cards, bank account transfers, coupon code and/or link, promotion code and/or link, accumulated user points. Online payment means that payments details are processed electronically after the user submits payments details and includes all paying option available that is online supported by the web and the store and/or group of users at the time the order is processed. Online payments options may change from time to time when new options are introduced and/or old option are obsolete. Offline payment includes all non online payments procedure including sending payment details by fax, email, mail, messaging utilities including SMS, phone call or any other way that the user find secure enough to disclose private paying information offline and includes all paying option available that are supported by the web and/or the store and/or group of users at the time the order is processed. Prepaid/Postpaid electronic cards comprising mechanism to define per user personal usage parameters like maximum monthly usage and/or maximum daily usage and/or usage hours and/or items limited to pages/stores/categories usage. These personal usage parameters are applied per user when presented to the user and/or when adding item to shopping cart and/or when paying for the purchase.

DETAILED DESCRIPTION OF THE INVENTION

This invention defines method and system for improving efficiency of E commerce shopping from a picture or motion picture on the Internet. It includes ordering procedure and all supporting surrounding that enable a convenient and efficient shopping including:—
- Ways to present more information in addition to the information on the "ordering picture".
- Ways to handle items and sales message that need user interaction to specify relevant parameters.
- Ways to support multi items/multi vendors and/or any combination on the same "ordering picture".
- Ways to handle sales/promotion messages presented on "ordering picture".
- Ways to support payment with user localized payment cards or coupons that are presented as payment option.

This invention allows users to add items into a "shopping cart" [FIG. 3] directly from a "static ordering picture" [FIG. 5] presented on the internet/intranet. The "static ordering picture" is processed before being delivered to the respective web site to define sensitive areas, such as an "item area" [501]. The sensitive areas define items/multi store items/deals/bulk sale for ordering. "Direct add" means that shopper will not have to go through a constant predefined procedure that applies to all item added into shopping cart. "Click" on "item area" [501] will add the item into the "shopping cart" [FIG. 3].

Figure 6:
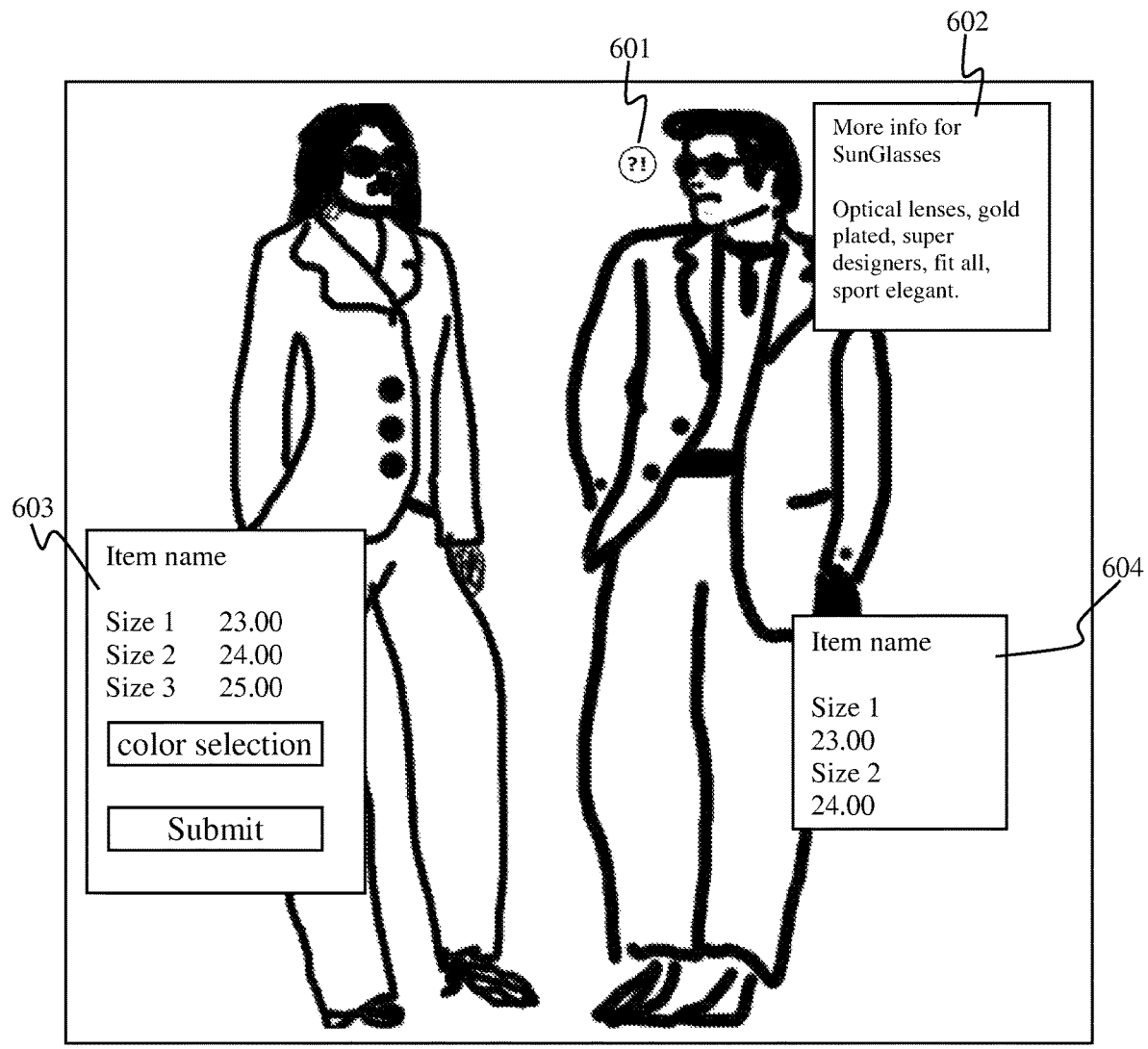
FIG. 6 is an example for local frames. The example shows more info, size select, size and color select local frames.
Figure 8:
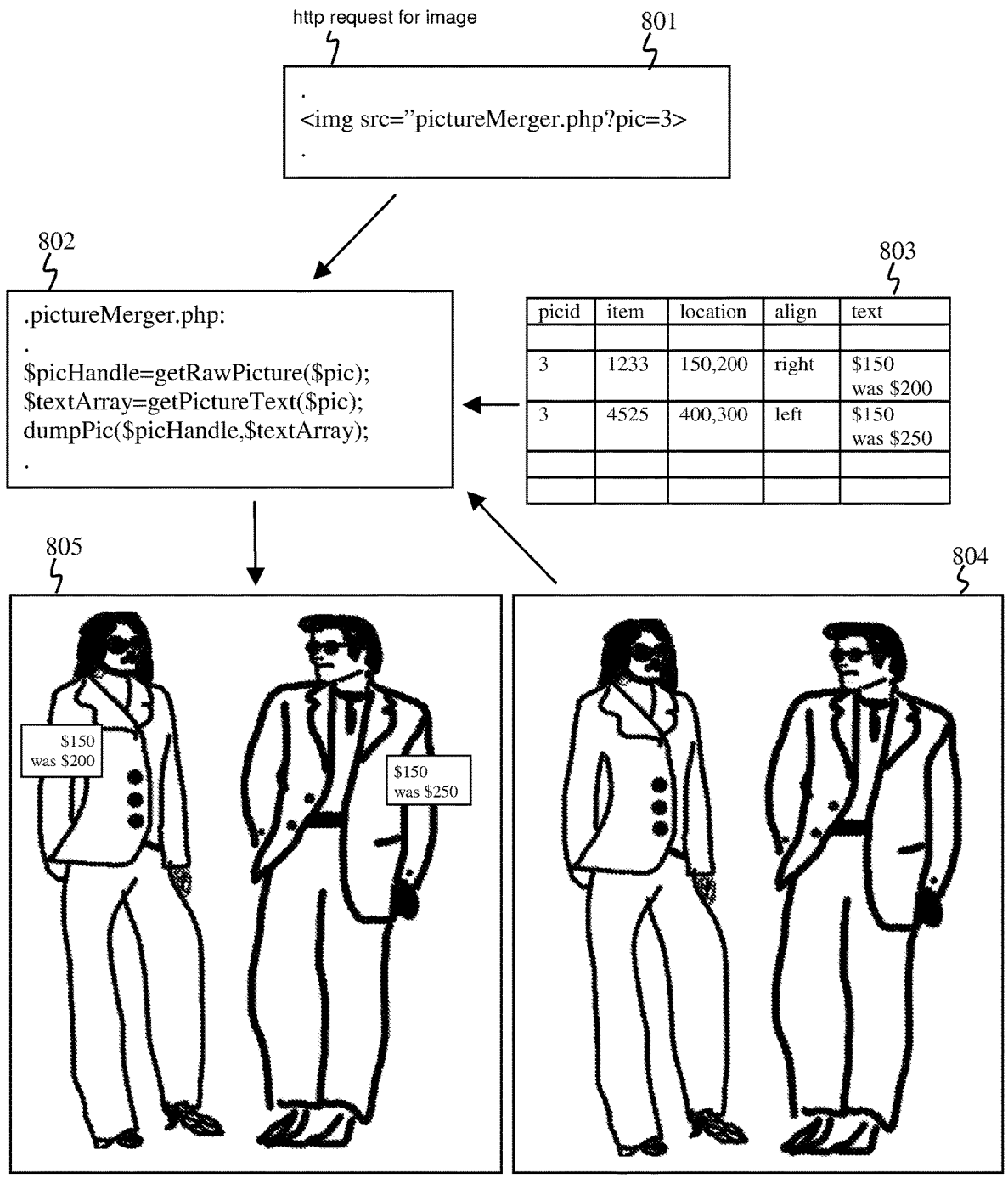
FIG. 8 is an example for text dynamically inserted to a picture before sending picture content to user computer.

There are items that cannot be ordered using one "click". These items need parameter selection in order to be added to "shopping cart". For these items "click" on "item area" will discover the "parameter select" [603 and/or 604] where the user will be able to complete item addition to "shopping cart". FIG. 6 demonstrates two parameter select frames. One with multiple parameters to select from [603] and the other with single select parameters [604].

"Parameter select" enables the user to verify that his preferred parameters are available on the spot without having to be transferred to a parameters selection page where he might find that his preferred parameters are not available. This makes shopping experience reliable and efficient.

We will refer "add item" thereafter for the global operation of adding an item to the "shopping cart" including the "direct add" and the item add that requires "parameter select".

An icon will be presented for items that have "more info" [601]. "Click" this icon will show/open a "more info" [602] "local frame"/"more info window" depending on the content of the "more info". When "ordering picture" presented to the user supply all the information needed for the user to decide whether he wants or not to buy the item or the user is familiar with the item, user can directly add the item to the "shopping cart" saving unnecessary transfers to extra pages (more information page), thus making shopping experience more efficient.

This invention further allows users to add items into a "shopping cart" from a "moving ordering picture" presented on the internet/intranet. "Click" on "item area" issues a hidden request to the server with all needed parameters including coordinate and moving picture timestamp. According to the server reply the item will be added into the "shopping cart" or may present "local frame" like "more info" or "add item form" which defines all necessary selections for the item. "Clicking" the submit button on this "local frame" will add the item into the "shopping cart" according to the selected parameters (where applicable). In this case clicking the "moving ordering picture" will pause the moving picture until the "local frame" is closed or an item is ordered.

There are pages where item presented can be supplied from various vendors, we will refer it as "vendor auction". "Click" on "vendor auction" will show "Provider select" where the user can "click" his preferred vendor thus adding the item into "shopping cart". The user will be able to define his preferred vendors (which can be saved for registered users). In such case if a preferred vendor is part of a "vendor auction" vendors, this vendor item will be added to the "shopping cart" without the "provider select" interaction. In case of multiple preferred vendors, these vendors will appear at the top of the "provider select".

For example digital camera "such and such" is "vendor auction" item, "click" on "vendor auction" (for camera in this case) will show "provider select", "click" on the vendor will add the selected vendor item into "shopping cart". "Vendor auction" makes shopping experience efficient saving the user the need to interact with multiple web sites to look for various vendor pricing and terms.

In some catalogs/magazines and promotion materials, items appear in multiple places on various pages in various angles or situations in order to attract the customer to buy in a spontaneous way or from any reason the designer intended to. These items may be added to "shopping cart" from all appearances as the same store item, thus when adding an item twice from other pages, it will still accumulate item quantity in "shopping cart".

Some advertisement/promotion/magazine materials combine multiple items from various vendors on the same picture (for example: fashion magazine shows pictures of a model wearing "Banana republik" shirt and pans, "Alda" shoes, "Polise" Sunglasses holding "Optimum" perfume). "Click" on each "item area" "add item" to the "shopping cart".

It further allows item presentation and navigation in a way that makes E commerce shopping fast, efficient and convenient. Three improvements in ordering process make shopping experience more user friendly:—

"Direct add" saves at least one page interaction and one click related to current procedures, making shopping efficient, faster and convenient "Local frame" keeps the user in the "same user interface" and shortening the time for "more info", "parameter select" or other information that is presented in a "local frame". This way user does not lose contact with the page and "ordering picture", making shopping faster and convenient. "Language translation" allows localization of worldwide presented designer's promotion materials, making shopping from foreign language promotion material possible and convenient.

"Shopping cart" keeps the user in the "same user interface" and enabling the user to be updated about his "shopping cart" status at a glance.

"More info window" will be used in categories where the nature of the product is sophisticated and the feature list is large. Since in most cases of such sophisticated item people are checking item characteristics in the manufacturer specifications and/or in professional reviewers and only then looking for a place to shop, they will not use this "more info" often. Usually "more info window" will present to the user the manufacturer specification page.

Said method further defines various item pricing and/or "deals" presentation in the said "ordering picture" to be added into "shopping cart" and processed in accordance to the "deal".

When pricing information is missing in the "ordering picture", it is presented using "static inserted info" and/or the "dynamic inserted info" or within "parameter select" for items that its price is parameter dependent (for example: Soda—large=3, medium=2, small=1).

There are promotion materials that are delivered to potential shoppers through paper distribution or other direct distribution. In these promotion materials, there are many "deals". This invention answers ordering from promotion materials presented on the Internet while applying "deals" into user "shopping cart" when "deals terms" are reached and/or by direct order based on "item deal area" as will be further described. All items in the "shopping cart" that are part of a non reached "deal terms" will be presented to the user with an pending "deal terms" icon, keeping the user informed at all time that the item ordered is part of a "deals". "Clicking" this icon will open a "local frame" informing the user with item related "deals" details giving him the option to replace the item with the "deal" content.

"Clicking" the "item deal area" of a "singular benefit" "deal" on the "ordering picture" will "direct add" the deal to the "shopping cart" as a package including all free "benefits" and non-free "benefits".

"Clicking" the "item deal area" of a "benefit choice" "deal" will present to the user "benefit list" to choose the preferred "benefits" and add it as a package with the selected "benefits" to "shopping cart".

"Clicking" the "item deal area" of a "deal" with "deal term choices" will present to the user "deal term choice list" to select the preferred choices and add the selected choices as a package to "shopping cart".

Applying "deals" into user "shopping cart" will be done when "deals terms" are reached. In some cases, it will require user interaction.

Free "benefits" will be added to user "shopping cart" automatically when "deal terms" are reached (for example— buy 3 pizza get large soda, soda will be added automatically to "shopping cart" when "shopping cart" include 3 pizza.

Non free "benefits" or multiple "benefits" presented in a "benefit list" will, at the time "shopping cart" order content meets "deal terms", add "benefit" entitling icon or message in the "shopping cart" that when "clicked" will open a "benefit list". The user then can add "benefits" to the "shopping cart" according to deal limitation. In addition, when checking out, an alert indicating that there are pending "benefits" will be generated to finally enable the user to explore these "benefits" or continue to checkout.

The same applies to "sum deal".

Any changes made by the user in the "shopping cart" will automatically present the applicable "benefits" according to the changes made. For example if a user added 3 pizzas to the "shopping cart" and large soda was added automatically for free, when the user reduce the amount of pizza the large soda will be removed automatically.

There are cases where stores/vendors are presenting bulk sales for various marketing purposes. This invention answers ordering "group bulk sale" promotion materials presented on the Internet while applying "group bulk sale" terms. "Clicking" on the "group bulk sale area" present to the user a "group sale select". User then "click" to select item preferred parameters (where applicable) and "click" to select the preferred item (In "item flex group bulk sale") and "click" on the "join the sale" button to enable the user to commit for the sale. In "price flex group bulk sale" users are charged according to the sale final results.

It further defines various ordering and payments methods to support "shopping cart" checkout. User can pay for his purchase in a "flexible payment procedure" using any available electronic way includes (partial list) magnetic cards, pre-paid cards, credit cards, debit cards, company cards, member club cards, money transfer through bank account, accumulated points, coupon, promotion code and the like. User will need to fill information that is required for the selected payment option.

In some cases, the store or a group of stores can be the issuer of such pre paid cards. These cards may also be used in store physical stores.

User can also pay with accumulating cards (post paid), which are used according to card policy and limitations (for example day usage/period usage).

All payment options will be checked against payment option authority (for example credit card issuer) and in accordance approves or disapprove the payment.

Payment options are clearly introduced in the "shopping cart" by means of logo, icon, or text list.

The user is able to select payment method. The user will also have the possibility to send payment details by fax or Email. All non on-line payment procedure will be processed only after payment details received and verified.

On-line payment verification will be done separately for each store/group of stores in the "shopping cart".

New payment options will be added from time to time to keep flexible paying procedure making shopping experience convenient and efficient for the user.

The invention further allows the user to limit multi vendor item to present only vendors that meets geographical limitation and/or level threshold rated vendors.

In one embodiment, a group administrator is defined for a group of users. The group administrator can select pages/stores/categories or any combination to be presented to the group of users. The group administrator can also define payment options and global/sector constraints for the group of users. The group administrator also has access to group related reports. Identified users from the group of users can add items from the customized web site to a shopping cart.

This invention further supports sale and deals interaction with the users. Users will have the ability to vote for their preferred item they wish to see as "deals". An icon is presented in the navigation tools that will open "local frame" detailing all items on the page. User will select its preferred item and submit. Only registered users will have the ability to participate. Vendors will have the ability to respond with "deals".

This invention also support registered users latest buy list. After identifying the user, an icon will be presented that on "click" will show "local frame" with the user latest/preferred items. List sorting may be per shopping date/per quantity bought/per number of times of shopping for an item and the like. When the user select specific vendor to shop from, the list will include only items bought from this vendor. "Click" on an item from the list will "direct add" the item to the "shopping cart". Items that appear on the list and are not available in stock will not be "clickable". This enable the user to buy an already bought item once again even without looking for the page item appears in. This makes shopping experience convenient easy and fast.

In order to make the shopping experience more convenient, picture presented are based on a large detailed picture. The picture presented in normal mode will fit into picture frame in a standard display (in the preferred embodiment 1024×768 pixels window size). The user can then chose to see enlarged picture or use zoom magnifier. In both the normal mode and the enlarged picture, the user can "click" and add item to "shopping cart". Since usually enlarged pictures are greater than the picture frame, user needs to use scrolling bars to explore the entire picture. In order to make it more convenient for the user, an auto scroll feature is also available. This feature scrolls the picture when user-pointing device is over picture frame edges. Items in the enlarged picture can be added to the shopping cart by clicking thereon, as described above. The zoom magnifier presents a moving "local frame" that present an enlarged picture of the zoomed area. Zooming area (not zooming factor) can be increased or reduced.

Some other measures can help creating a better shopping experience like:—

Playing a sound when the item was added to the "shopping cart" which will indicates to the user that the item was added even when the "shopping cart" is hidden.

Special "shopping cart" split feature. This feature can be applied for all items that have more than one vendor. In this case user add items to "shopping cart". At any time the user will have the possibility to select whether to split "shopping cart" content so that the total amount will be the minimal, or buy from a single store that its total sum is smallest or by delivery time or other parameters. This makes shopping experience convenient, easy, and fast.

Presented shopping cart includes also savings controls for multi stores items that allow the user to recalculate shopping cart taking in account the items from the store that best fits his recalculation constraint. Said recalculation constraint can be price/store/shipment constraints or any other constraint that is supported by the web site at the time of order. Presented shopping cart include also user related information like user accumulated point, shopping cart error messages, unexplored promotion deals icons, helps and the like user supporting information controls. Stores that preferred to have dedicated shopping cart are presented in a single store session, this will enable the user to see and pay only for this shopping cart. Switching to other store that prefer a dedicated shopping cart, switch also the shopping cart. Switching to a store without dedicated shopping cart preference, switches to the multi store shopping cart that do not include dedicated shopping cart stores items.

SUMMARY

Shopping based on a picture in any attractive presentation way, while giving interactive resolution about prices/stores/vendors/sales is a new advanced concept for shoppers and vendors for e-commerce on the web. This invention makes the experience of shopping e-commerce web site fast, simple, convenient and clear. User is interacting with a single user interface that includes all navigating and shopping information. Adding item to "shopping cart" is short (in most cases one click will be enough to add the item to "shopping cart") and intelligent (when there is only one parameter to chose from, the user need only to click the preferred parameter to add the selected parameter item to "shopping cart" and close interactive local frame). "Shopping cart" is detailed and clear and support multi store "shopping cart", all deals information are presented in a distinctive way to make it possible for the user to identify shopping cart status at a glance. Delivery costs are specified per item and per store where applicable. Items and deal are grouped per store and sorted. Features like "vendor auction" and others contribute for better shopping experience.

What is claimed is:

1. A computer implemented method of online shopping of offerings for sale displayed in promotion materials, the method comprising:

providing, by a web server, for display, a web page in a web browser, the web page comprising an electronic shopping cart and a promotion material ordering picture, said electronic shopping cart positioned within a predetermined cart section of the web page and said promotion material ordering picture positioned within a predetermined picture section of the web page, said promotion material ordering picture being an electronic version of a catalog page, a magazine page, a brochure, a flyer, a leaflet or a poster, and comprising a plurality of illustrations of offerings for sale;

defining, by the web server, a plurality of areas within said promotion material ordering picture, each of said plurality of defined areas comprising at least one of said plurality of illustrations of offerings for sale, said web server having particular information associated with each of the offerings for sale illustrated in said promotion material ordering picture, each of said plurality of defined areas of said promotion material ordering picture arranged to be selectable responsive to a user selection action addressed to said respective defined area when the web page is displayed in the web browser; and responsive to the user selection action addressed to a particular one of said plurality of selectable defined areas, adjusting, by the web server, said electronic shopping cart according to the particular information associated with the at least one offering for sale illustrated in the selected defined area when the web page is displayed in the web browser;

providing in the web page, by the web server, at least one command option selectable responsive to a user command selection gesture; and adjusting, by the web browser, said promotion material ordering picture, responsive to the user command selection gesture, while the web page is displayed in the web browser, wherein said at least one command option comprises an ordering picture control option, wherein adjusting said promotion material ordering picture while the web page is displayed in the web browser comprises: adjusting the position of said promotion material ordering picture within the web page or adjusting the size of said promotion material ordering picture, wherein each of the plurality of offerings for sale is associated with one or more items for sale, and wherein each of the plurality of illustrations of offerings for sale comprises a picture, a sign or a textual illustration.

2. The method of claim 1, wherein the user selection action consists of only a single selection of said defined area and wherein said adjusting said electronic shopping cart is directly responsive to the single user selection action.

3. The method of claim 1, wherein a list of parameters are associated with one of the offerings for sale of the selected defined area, the method further comprising:
responsive to the user selection action, further providing in the web page, by the web server, a selection local frame comprising a selectable list of parameters associated with the respective offering for sale, each parameter of said selectable list of parameters arranged to be selected responsive to a parameter selection user action,
wherein said selection local frame appears around the respective defined area selected responsive to the user selection action.

4. The method of claim 3, wherein said adjusting said electronic shopping cart is directly responsive to the parameter selection user action, the method further comprising closing said selection local frame directly responsive to the parameter selection user action.

5. The method of claim 3, wherein said selectable list of parameters comprises a plurality of parameters, said plurality of parameters arranged such that only a single parameter of the plurality of parameters can be selected by the parameter user action.

6. The method of claim 3, wherein said selectable list of parameters is arranged such that a plurality of said parameters can be selected by the parameter user action.

7. The method of claim 1, wherein at least one of the offerings for sale illustrated in said promotion material ordering picture is a deal corresponding to the one or more items for sale with which the at least one of the offerings for sale is associated.

8. The method of claim 7, the method further comprising:
responsive to the user selection action addressed to a respective one of said defined areas that comprises the at least one of the offerings for sale that is the deal, further providing in the web page, by the web server, a local frame comprising a selectable list of deal terms or benefit choices associated with the deal illustrated in said selected defined area, each of said selectable list of deal terms or benefit choices arranged to be selected responsive to a deal selection user action,
wherein said local frame defines an area in the web page that appears around the respective defined area selected responsive to the user selection action, and
wherein said adjusting of said electronic shopping cart is responsive to the user selection action.

9. The method of claim 1, further comprising:
a hide/reveal shopping cart option, said hide/reveal shopping cart option arranged to be selectable responsive to a hide shopping cart user gesture and further arranged to be selectable responsive to a reveal shopping cart user gesture;
hiding, by the web browser, said electronic shopping cart responsive to the hide shopping cart user gesture such that only certain information regarding the electronic shopping cart appears in the web page, and adjusting the size or position of said ordering picture; and
revealing, by the web browser, said hidden electronic shopping cart in the web page, responsive to the reveal shopping cart user gesture, such that said electronic shopping cart and said ordering picture are simultaneously provided in the web page displayed in the web browser.

10. The method of claim 9, wherein said reveal shopping cart user gesture is addressed to said displayed hide/reveal shopping cart option, said electronic shopping cart and said promotion material ordering picture provided in the web page as long as said reveal shopping cart user gesture addressed to said displayed hide/reveal shopping cart option is maintained, said hide shopping cart user gesture consisting of a cessation of said reveal shopping cart user gesture.

11. The method of claim 1, further comprising:
providing, by the web server, in said promotion material ordering picture a more info icon associated with one of the offerings for sale illustrated on said promotion material ordering picture, said more info icon arranged to provide for a user information request gesture addressed thereto when the web page is displayed in the web browser; and
providing in the web page, by the web server, a more info local frame with information associated with the offering for sale responsive to the user information request gesture,
said more info local frame defining an area that appears around said provided more info icon.

12. The method of claim 1, wherein said electronic shopping cart contains one of the items for sale associated with one of the plurality of offerings for sale illustrated on said promotion material ordering picture, wherein said particular information associated with the one of the items for sale contained in the electronic shopping cart comprises at least one of: at least one name of the one of the items for sale; quantity of the one of the items for sale; name of at least one vendor who supplies the one of the items for sale; and the price of the one of the items for sale, the method further comprising:
providing, by the web server, within said electronic shopping cart, when the web page is displayed in the web browser, an interactive message associated with the one of the items for sale contained in said electronic shopping cart, said interactive message arranged to be selectable responsive to a user information request gesture, said interactive message provided responsive to pending deal terms associated with said particular information associated with the one of the items for sale contained in said electronic shopping cart, said pending deal terms being illustrated on said promotion material ordering picture; and
responsive to the user information request gesture, providing in the web page, by the web server, when the web page is displayed in the web browser, in a local frame that appears around said provided interactive message selected responsive to the user information request gesture, a graphical representation of the pending deal terms associated with the one of the items for sale contained in said electronic shopping cart, said graphical representation arranged to be selectable responsive to a local frame deal choice selection user action,
wherein said adjusting of said electronic shopping cart is responsive to the local frame deal choice selection user action.

13. The method of claim 1, wherein said electronic shopping cart contains a plurality of the items for sale having a plurality of vendors, the method further comprising:
providing in the web page, by the web server, a shopping cart split feature, arranged to be enabled responsive to a split shopping cart user input, said shopping cart split feature arranged to split the content of said electronic shopping cart so that a user can select one of a plurality of options of purchasing the plurality of items having the plurality of vendors, said plurality of options comprising:

purchasing the plurality of items for a lowest total price;

purchasing the plurality of items from a particular one of the plurality of vendors which provides the lowest total price of the purchased items; and purchasing the plurality of items according to a delivery time.

14. The method of claim 1, wherein said promotion material ordering picture further comprises an additional illustration, the additional illustration comprising text, the method further comprising:

defining, by the web server, an area within said promotion material ordering picture comprising the additional illustration, said defined area comprising the additional illustration arranged to be selectable responsive to the user selection action addressed thereto; and responsive to the user selection action addressed to said defined area comprising the additional illustration, providing in the web page, by the web server, a local frame comprising a translation of the text of the additional illustration to a language different than the language of the text of the additional illustration.

15. The method of claim 1, further comprising:

providing in the web page, by the web server, a search tool arranged to perform a search responsive to a user input, said search performed on a plurality of promotion material ordering pictures;

responsive to said search, providing in the web page, by the web server, promotion material ordering pictures, each comprising an illustration of an offering for sale related to the user input; and providing in the web page, by the web server, information regarding the offerings for sale illustrated in the promotion material ordering pictures.

16. The method of claim 1, wherein said promotion material ordering picture is a motion picture or a video, the method further comprising receiving from the web browser the coordinates of the user selection action and a timestamp of the motion picture or the video at the time of the user selection action, the selection of each of said plurality of selectable defined areas being responsive to said received coordinates and timestamp.

17. The method of claim 16, wherein the user selection action consists of only a single selection of said defined area and wherein said adjusting said electronic shopping cart is directly responsive to the single user selection action.

18. The method of claim 16, further comprising:

providing in the web page, by the web server, a hide/reveal shopping cart option, said hide/reveal shopping cart option arranged to be selectable responsive to a hide shopping cart user gesture and further arranged to be selectable responsive to a reveal shopping cart user gesture;

hiding, by the web server, said electronic shopping cart responsive to the hide shopping cart user gesture such that only certain information regarding the electronic shopping cart appears in the web page, and adjusting the size or position of said ordering picture; and revealing, by the web server, said hidden electronic shopping cart in the web page, responsive to the reveal shopping cart user gesture, such that said electronic shopping cart and said ordering picture are simultaneously provided in the web page displayed in the web browser.

19. The method of claim 1, wherein one of the plurality of illustrations of offerings for sale comprises an illustration of a discount coupon.

20. The method of claim 1, further comprising:

providing in the web page, by the web server, a shopping cart altering control arranged to alter an offering for sale contained in said electronic shopping cart, said altering responsive to a user input; and adjusting said electronic shopping cart responsive to deal terms associated with said altered offering for sale.

21. The method of claim 1, further comprising:

providing in the web page, by the web server, dynamic information associated with said promotion material ordering picture.

22. The method of claim 1, further comprising:

providing, by the web server, for display in the web page, a shopping cart delete control arranged to delete one of the items for sale contained in said electronic shopping cart, said deleting responsive to a user input.

23. The method of claim 1, wherein defining, by the web server, the plurality of areas comprises defining, by the web server first and second areas within said promotion material ordering picture, the first and the second areas comprising a first and a second of the plurality of illustrations of offerings for sale, respectively, which are associated with a same offering for sale, said adjusting said electronic shopping cart comprising adjusting said electronic shopping cart according to particular information associated with the same offering for sale, responsive to the user selection action addressed to any of said first area comprising the first illustration of offering for sale and said second area comprising the second illustration of offering for sale.

24. The method of claim 1, wherein adjusting said promotion material ordering picture while the web page is displayed in the web browser further comprises replacing said promotion material ordering picture with a different promotion material ordering picture.

25. The method of claim 24, wherein said different promotion material ordering picture is selected from one of: a different catalog page; a different magazine page; a different brochure page; a different flyer page; a different leaflet page; a different category; and a different store.

26. The method of claim 1, wherein the plurality of offerings for sale are offered by at least two vendors or stores.

27. A system enabling online shopping of offerings for sale displayed in promotion materials, the system for use with a user computer comprising a user computer display, the system comprising:

a web server; and a database associated with the web server, said database arranged to store thereon said particular information associated with a plurality of the offerings for sale, wherein said web server is arranged to provide, via a network, for simultaneous display on said user computer display, an electronic shopping cart and a promotion material ordering picture, said electronic shopping cart positioned within a predetermined cart section of a web page and said promotion material ordering picture positioned within a predetermined picture section of the web page, said simultaneous display responsive to a display of the web page in a web browser of said user computer, wherein said promotion material ordering picture is an electronic version of a catalog page, a magazine page, a brochure, a flyer, a leaflet or a poster, and comprises a plurality of illustrations of the offerings for sale, wherein said web server is arranged to define a plurality of areas within said promotion material ordering picture, each of said plurality of defined areas comprising at least one of said plurality of illustrations of the offerings for sale, said web server having particular information associated with each of the plurality of offerings for sale illustrated in said promotion material ordering picture, wherein each of said plurality of defined areas of said promotion material ordering picture is arranged to be selectable responsive to a user selection action addressed to said respective defined area when said promotion material ordering picture is displayed on said user computer display, wherein said web server is further arranged, responsive to the user selection action addressed to a particular one of said plurality of selectable defined areas, to adjust said electronic shopping cart according to said particular information associated with the at least one offering for sale illustrated in the selected defined area, wherein said web server is further arranged to simultaneously display on said user computer display at least one command option selectable responsive to a user command selection gesture; and adjust said promotion material ordering picture, responsive to the user command selection gesture, while maintaining said simultaneous display, wherein said at least one command option comprises an ordering picture control option, and wherein said web server is arranged such that said arrangement to adjust said promotion material ordering picture while maintaining said simultaneous display comprises an arrangement to adjust the position of said promotion material ordering picture within said user computer display or an arrangement to adjust the size of said promotion material ordering picture, wherein each of the plurality of offerings for sale is associated with one or more items for sale, wherein each of the plurality of illustrations of offerings for sale comprises a picture, a sign or a textual illustration, and wherein said web server is further arranged to update said electronic shopping cart display on said user computer display, responsive to said adjustment, while maintaining said simultaneous display.

28. The system of claim 27, wherein the user selection action consists of only a single selection of the selected particular one of the defined areas and wherein said arrangement to adjust said electronic shopping cart is directly responsive to the user selection action.

29. The system of claim 27, wherein said web server is further arranged to provide in said promotion material ordering picture a more info icon, said provided more info icon associated with one of the offerings for sale illustrated on said promotion material ordering picture, said more info icon arranged to provide for a user information request gesture addressed thereto when said promotion material ordering picture is displayed on said user computer display and wherein said web server is further arranged, responsive to the user information request gesture to retrieve from said database the information associated with the associated offering for sale, wherein said web server is further arranged to cause said user computer to display said retrieved information on said user computer display in a more info local frame defining an area that appears around said more info icon.

30. The system of claim 27, wherein the information associated with one of said plurality of offerings for sale of the selected defined area comprises a selectable list of parameters and wherein said web server is further arranged, responsive to the user selection action, to retrieve from said database the selectable list of parameters associated with the respective offering for sale, and wherein said web server is further arranged to cause said user computer to display on said user computer display, in a selection local frame, said retrieved selectable list of parameters, while maintaining said simultaneous display, each parameter of said selectable list of parameters arranged to be selected responsive to a parameter selection user action, wherein said selection local frame appears around the respective defined area selected responsive to the user selection action.

31. The system of claim 30, wherein said arrangement to adjust said electronic shopping cart is directly responsive to the parameter user action, wherein said web server is further arranged to close said selection local frame directly responsive to the parameter selection user action.

32. The system of claim 30, wherein said selectable list of parameters comprises a plurality of parameters, said plurality of parameters arranged such that only a single parameter of the plurality of parameters can be selected by the parameter user action.

33. The system of claim 30, wherein said selectable list of parameters is arranged such that a plurality of said parameters can be selected by the parameter user action.

34. The system of claim 27 wherein said web server is further arranged to:
simultaneously display on said user computer display a hide/reveal shopping cart option, said hide/reveal shopping cart option arranged to be selectable responsive to a hide shopping cart user gesture and further arranged to be selectable responsive to a reveal shopping cart user gesture;
hide said electronic shopping cart responsive to the hide shopping cart user gesture such that only certain information regarding the electronic shopping appears on said user computer display, and adjust the size or position of said ordering picture; and
reveal said hidden electronic shopping cart on said user computer display responsive to the reveal shopping cart user gesture, such that said electronic shopping cart and said ordering picture are simultaneously displayed on said user computer display.

35. The system of claim 34, wherein said web server is arranged such that said reveal shopping cart user gesture is addressed to said displayed hide/reveal shopping cart option, said electronic shopping cart and said promotion material ordering picture simultaneously displayed on said user computer display as long as said reveal shopping cart user gesture addressed to said displayed hide/reveal shopping cart option is maintained, said hide shopping cart user gesture consisting of a cessation of said reveal shopping cart user gesture.

36. The system of claim 27, wherein said electronic shopping cart contains one of the items for sale associated with one of the plurality of offerings for sale illustrated on said promotion material ordering picture, wherein said particular information associated with the one of the items for sale contained in the electronic shopping cart comprises at least one of: at least one name of the one of the items for sale; quantity of the one of the items for sale; name of at least one vendor who supplies the one of the items for sale; and the price of the one of the items for sale, and wherein said web server is further arranged to:
  display within said electronic shopping cart an interactive message associated with the one of the items for sale contained in said electronic shopping cart, said interactive message arranged to be selectable responsive to a user information request gesture, said interactive message provided responsive to pending deal terms associated with said particular information associated with the one of the items for sale contained in said electronic shopping cart, said pending deal terms being illustrated on said promotion material ordering picture; and
  responsive to the user information request gesture, display on said user computer display, in a local frame that appears around said displayed interactive message selected responsive to the user information request gesture, a graphical representation of the pending deal terms associated with the one of the items for sale contained in said electronic shopping cart, said pending deal terms additionally illustrated on said promotion material ordering picture, said graphical representation arranged to be selectable responsive to a local frame deal choice selection user action,
  wherein said shopping cart adjustment is responsive to the local frame deal choice selection user action.

37. The system of claim 27, wherein said electronic shopping cart contains a plurality of the items for sale having a plurality of vendors, and wherein said web server is further arranged to provide a shopping cart split feature, arranged to be enabled responsive to a split shopping cart user input, said shopping cart split feature arranged to split the content of said electronic shopping cart so that a user can select one of a plurality of options of purchasing the plurality of items having the plurality of vendors, said plurality of options comprising:
  purchasing the plurality of items for a lowest total price;
  purchasing the plurality of items from a particular one of the plurality of vendors which provides the lowest total price of the purchased items; and
  purchasing the plurality of items according to a delivery time.

38. The system of claim 27, wherein said promotion material ordering picture further comprises an additional illustration, the additional illustration comprising text, wherein said web server is further arranged to:
  define an area within said promotion material ordering picture comprising the additional illustration, said defined area comprising the additional illustration arranged to be selectable responsive to the user selection action addressed thereto; and
  responsive to the user selection action addressed to said defined area comprising the additional illustration display a local frame comprising a translation of the text of the additional illustration to a language different than the language of the text of the additional illustration.

39. The system of claim 27, wherein the user selection action consists of only a single selection of the selected defined area of said adjusted promotion material ordering picture and wherein said arrangement to adjust said electronic shopping cart is directly responsive to the single user selection action.

40. The system of claim 27, wherein said web server is further arranged to:
  simultaneously display on said user computer display a search tool arranged to perform a search responsive to a user input, said search performed on a plurality of promotion material ordering pictures;
  responsive to said search, display on said user computer display promotion material ordering pictures, each comprising plurality of illustrations of offerings for sale related to the user input; and display, on said user computer display, information regarding the offerings for sale illustrated in the displayed promotion material ordering pictures.

41. The system of claim 27, wherein said promotion material ordering picture is a motion picture or a video, said web server further arranged to receive from said user computer the coordinates of the user selection action and a timestamp of the motion picture or the video at the time of the user selection action, the selection of each of said plurality of selectable defined areas being responsive to said received coordinates and timestamp, wherein said arrangement to adjust said electronic shopping cart is directly responsive to said user selection action.

42. The system of claim 41, wherein said web server is further arranged to:
  simultaneously display on said user computer display a hide/reveal shopping cart option, said hide/reveal shopping cart option arranged to be selectable responsive to a hide shopping cart user gesture and further arranged to be selectable responsive to a reveal shopping cart user gesture;
  hide said electronic shopping cart responsive to the hide shopping cart user gesture such that only certain information regarding the electronic shopping appears on said user computer display, and adjust the size or position of said ordering picture; and reveal said hidden electronic shopping cart on said user computer display responsive to the reveal shopping cart user gesture, such that said electronic shopping cart and said ordering picture are simultaneously displayed on said user computer display.

43. The system of claim 27, wherein one of said plurality of illustrations of offerings for sale comprises an illustration a discount coupon.

44. The system of claim 27, wherein said web server is further arranged to display on said user computer display a shopping cart delete control arranged to delete one of the items for sale contained in said electronic shopping cart, said deletion responsive to a user input.

45. The system of claim 27, wherein the plurality of areas include first and second areas within said promotion material ordering picture, the first and the second areas comprising a first and a second of the plurality of illustrations of offerings for sale, respectively, which are associated with a same offering for sale, said electronic shopping cart adjustment comprising an adjustment of said electronic shopping cart according to particular information associated with the same offering for sale, responsive to the user selection action addressed to any of said selectable defined area comprising the first illustration of offering for sale and said selectable defined area comprising the second illustration of offering for sale.

46. The system of claim 27, wherein at least one of the offerings for sale illustrated in said promotion material ordering picture is a deal corresponding to the one or more items for sale with which the at least one of the offerings for sale is associated, said web server further arranged to:

responsive to the user selection action addressed to a respective one of said defined areas that comprises the at least one of the offerings for sale that is the deal, further provide in the web page, by the web server, a local frame comprising a selectable list of deal terms or benefit choices associated with the deal illustrated in said selected defined area, each of said selectable list of deal terms or benefit choices arranged to be selected responsive to a deal selection user action, wherein said local frame defines an area in the web page that appears around the respective defined area selected responsive to the user selection action, and wherein said web server is arranged to adjust said electronic shopping cart responsive to the user selection action.

47. The system of claim 27, wherein said arrangement to adjust said promotion material ordering picture while maintaining said simultaneous display further comprises an arrangement to replace said promotion material ordering picture with a different promotion material ordering picture.

48. The system of claim 27, wherein the plurality of the offerings for sale are offered by at least two vendors or stores.

49. A computer implemented method of online shopping of offerings for sale displayed in promotion materials, the method comprising:

providing, by a web server, for display, a web page in a web browser, the web page comprising an electronic shopping cart and a promotion material ordering picture, said electronic shopping cart positioned within a predetermined cart section of the web page and said promotion material ordering picture positioned within a predetermined picture section of the web page, said promotion material ordering picture being an electronic version of a catalog page, a magazine page, a brochure, a flyer, a leaflet or a poster, and comprising an illustration of an offering for sale, defining, by the web server, an area within said promotion material ordering picture comprising said illustration of offering for sale, said web server having particular information associated with the offering for sale illustrated in said promotion material ordering picture, said defined area of said promotion material ordering picture arranged to be selectable responsive to a user selection action addressed to said defined area when the web page is displayed in the web browser; and responsive to the user selection action addressed to said selectable defined area, adjusting, by the web server, said electronic shopping cart according to the particular information associated with the offering for sale illustrated in the selected defined area when the web page is displayed in the web browser, providing in the web page, by the web server, at least one command option selectable responsive to a user command selection gesture; and adjusting, by the web browser, said promotion material ordering picture, responsive to the user command selection gesture, while the web page is displayed in the web browser, wherein said at least one command option comprises an ordering picture control option, wherein adjusting said promotion material ordering picture while the web page is displayed in the web browser comprises: adjusting the position of said promotion material ordering picture within the web page, adjusting the size of said promotion material ordering picture or replacing said promotion material ordering picture with a different promotion material ordering picture, wherein the offering for sale is associated with one or more items for sale, and wherein the illustration of offering for sale comprises a picture, a sign or a textual illustration.

50. The method of claim 49, wherein the user selection action consists of only a single selection of said defined area and wherein said adjusting said electronic shopping cart is directly responsive to the single user selection action.

51. The method of claim 49, further comprising:

providing, by the web server, for display in the web page, a shopping cart delete control arranged to delete one of the items for sale contained in said electronic shopping cart, said deleting responsive to a user input.

52. A system enabling online shopping of offerings for sale displayed in promotion materials, the system for use with a user computer comprising a user computer display, the system comprising:

a web server; and a database associated with the web server, said database arranged to store thereon said particular information associated with the offerings for sale, wherein said web server is arranged to provide, via a network, for simultaneous display on said user computer display, an electronic shopping cart and a promotion material ordering picture, said electronic shopping cart positioned within a predetermined cart section of a web page and said promotion material ordering picture positioned within a predetermined picture section of the web page, said simultaneous display responsive to a display of the web page in a web browser of said user computer, wherein said promotion material ordering picture is an electronic version of a catalog page, a magazine page, a brochure, a flyer, a leaflet or a poster, and comprises an illustration of an offering for sale, wherein said web server is arranged to provide in the web page at least one command option selectable responsive to a user command selection gesture; and wherein said web server is arranged to adjust said promotion material ordering picture, responsive to the user command selection gesture, while the web page is displayed in the web browser, wherein said at least one command option comprises an ordering picture control option, wherein adjusting said promotion material ordering picture while the web page is displayed in the web browser comprises: adjusting the position of said promotion material ordering picture within the web page, adjusting the size of said promotion material ordering picture or replacing said promotion material ordering picture with a different promotion material ordering picture, wherein said web server is arranged to define an area within said promotion material ordering picture comprises said illustration of offering for sale, said web server having particular information associated with the offering for sale illustrated in said promotion material ordering picture, wherein said defined area of said promotion material ordering picture is arranged to be selectable responsive to a user selection action addressed to said defined area when said promotion material ordering picture is displayed on said user computer display, wherein said web server is further arranged, responsive to the user selection action addressed to said defined area, to adjust said electronic shopping cart according to said particular information associated with the offering for sale illustrated in the selected defined area, wherein the offering for sale is associated with one or more items for sale, wherein the illustration of offering for sale comprises a picture, a sign or a textual illustration, and wherein said web server is further arranged to update said electronic shopping cart display on said user computer display, responsive to said adjustment, while maintaining said simultaneous display.

53. The system of claim 52, wherein the user selection action consists of only a single selection of the selected defined area and wherein said arrangement to adjust said electronic shopping cart is directly responsive to the user selection action.

54. The system of claim 52, wherein said web server is further arranged to display on said user computer display a shopping cart delete control arranged to delete one of the items for sale contained in said electronic shopping cart, said deletion responsive to a user input.

55. A computer implemented method of online shopping of offerings for sale displayed in promotion materials, the method comprising:
providing, by a web server, for display, a web page in a web browser, the web page comprising an electronic shopping cart and a promotion material ordering picture, said electronic shopping cart positioned within a predetermined cart section of the web page and said promotion material ordering picture positioned within a predetermined picture section of the web page, said promotion material ordering picture being an electronic version of a catalog page, a magazine page, a brochure, a flyer, a leaflet or a poster, and comprising a plurality of illustrations of offerings for sale;
providing in the web page, by the web server, a hide/reveal shopping cart option, said hide/reveal shopping cart option arranged to be selectable responsive to a hide shopping cart user gesture and further arranged to be selectable responsive to a reveal shopping cart user gesture;
hiding, by the web browser, said electronic shopping cart responsive to the hide shopping cart user gesture such that only certain information regarding the electronic shopping cart appears in the web page, and adjusting the size or position of said promotion material ordering picture; and revealing, by the web browser, said hidden electronic shopping cart in the web page, responsive to the reveal shopping cart user gesture, such that said electronic shopping cart and said promotion material ordering picture are simultaneously provided in the web page displayed in the web browser;
defining, by the web server, a plurality of areas within said promotion material ordering picture, each of said plurality of defined areas comprising at least one of said plurality of illustrations of offerings for sale, said web server having particular information associated with each of the offerings for sale illustrated in said promotion material ordering picture, each of said plurality of defined areas of said promotion material ordering picture arranged to be selectable responsive to a user selection action addressed to said respective defined area when the web page is displayed in the web browser; and
responsive to the user selection action addressed to a particular one of said plurality of selectable defined areas, adjusting, by the web server, said electronic shopping cart according to the particular information associated with the at least one offering for sale illustrated in the selected defined area when the web page is displayed in the web browser,
wherein each of the plurality of offerings for sale is associated with one or more items for sale, and
wherein each of the plurality of illustrations of offerings for sale comprises a picture, a sign or a textual illustration.

56. A system enabling online shopping of offerings for sale displayed in promotion materials, the system for use with a user computer comprising a user computer display, the system comprising:
a web server; and
a database associated with the web server, said database arranged to store thereon said particular information associated with a plurality of the offerings for sale,
wherein said web server is arranged to provide, via a network, for simultaneous display on said user computer display, an electronic shopping cart and a promotion material ordering picture, said electronic shopping cart positioned within a predetermined cart section of a web page and said promotion material ordering picture positioned within a predetermined picture section of the web page, said simultaneous display responsive to a display of the web page in a web browser of said user computer,
wherein said promotion material ordering picture is an electronic version of a catalog page, a magazine page, a brochure, a flyer, a leaflet or a poster, and comprises a plurality of illustrations of the offerings for sale,
wherein said web server is arranged to simultaneously display on said user computer display a hide/reveal shopping cart option, said hide/reveal shopping cart option arranged to be selectable responsive to a hide shopping cart user gesture and further arranged to be selectable responsive to a reveal shopping cart user gesture;
wherein said web server is arranged to hide said electronic shopping cart responsive to the hide shopping cart user gesture such that only certain information regarding the electronic shopping appears on said user computer display, and adjust the size or position of said promotion material ordering picture; and
wherein said web server is arranged to reveal said hidden electronic shopping cart on said user computer display responsive to the reveal shopping cart user gesture, such that said electronic shopping cart and said promotion material ordering picture are simultaneously displayed on said user computer display;
wherein said web server is arranged to define a plurality of areas within said promotion material ordering picture, each of said plurality of defined areas comprising at least one of said plurality of illustrations of the offerings for sale, said web server having particular information associated with each of the plurality of offerings for sale illustrated in said promotion material ordering picture,
wherein each of said plurality of defined areas of said promotion material ordering picture is arranged to be selectable responsive to a user selection action addressed to said respective defined area when said promotion material ordering picture is displayed on said user computer display,
wherein said web server is further arranged, responsive to the user selection action addressed to a particular one of said plurality of selectable defined areas, to adjust said electronic shopping cart according to said particular information associated with the at least one offering for sale illustrated in the selected defined area, wherein each of the plurality of offerings for sale is associated with one or more items for sale, wherein each of the plurality of illustrations of offerings for sale comprises a picture, a sign or a textual illustration, and wherein said web server is further arranged to update said electronic shopping cart display on said user computer display, responsive to said adjustment, while maintaining said simultaneous display.

* * * * *